United States Patent Office 3,422,192
Patented Jan. 14, 1969

3,422,192
1-LOWER ALKYL - 2,3 - EPITHIO-5α-ANDROSTAN-
17-β-OLS AND THEIR 17-LOWER ALKANOATES
Taichira Komeno, Osaka, Japan, assignor to Shionogi &
Co., Ltd., Osaka, Japan
No Drawing. Filed Feb. 17, 1966, Ser. No. 528,098
U.S. Cl. 424—241    4 Claims
Int. Cl. A61k 17/00; A61k 25/00; C07c 173/00

ABSTRACT OF THE DISCLOSURE 2,3-epithio-steroids of the formula

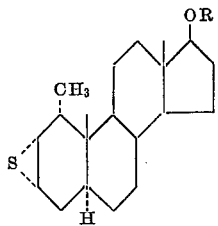

wherein R is H or alkanoyl, possess potent myotropic and androgenic activities with a favorable myotropic/androgenic ratio and also potent specific anti-estrogenic activity, and are useful as anabolic and antiestrogenic agents with low side effect, and also for the treatment of mastopathy and gynecomastia.

---

The present invention relates to 1-lower alkyl-2,3-epithio-5α-androstan-17β-ols and their 17-lower alkanoates represented by the general formula:

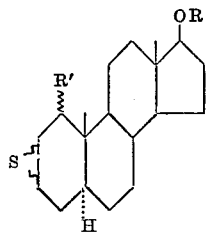

wherein R is a hydrogen atom or a lower alkanoyl group (e.g., formyl, acetyl, propionyl, butyryl, isobutyryl, valeryl, isovaleryl, trimethylacetyl, caproyl, t-butylacetyl, enanthoyl, capryloyl), R' is a lower alkyl group (e.g., methyl, ethyl, propyl) and the ripple mark (⌇) represents a generic indication of α- and β-configurations, and production thereof.

A basic object of the present invention is to embody the said 2,3-epithio-steriods of Formula I. Another object of this invention is to embody the 2,3-epithio-steroids (I) having peculiar hormonic activity. A further object of the invention is to embody a process for preparing the 2,3-epithio-steroids (I). These and other objects will be apparent to those conversant with the art to which the present invention pertains from the subsequent description.

The substantial conversion in the process of the present invention is represented by the following scheme showing only the A-ring of the steroid skeleton:

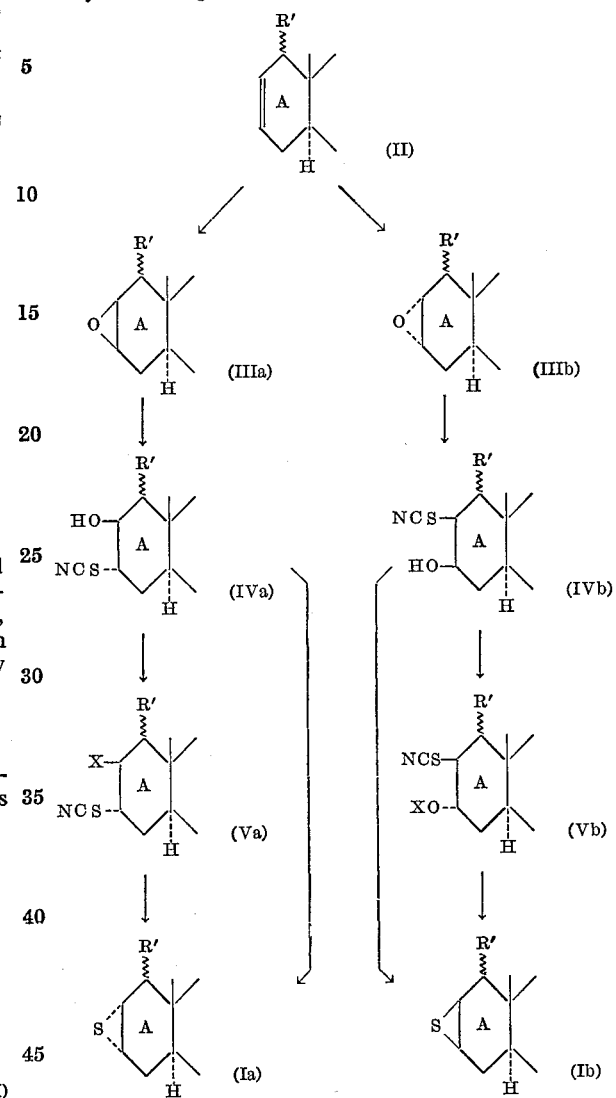

wherein X is a halogen atom (e.g., chlorine, bromine, iodine), a lower alkanoyloxy group (e.g., acetyloxy, propionyloxy, butyryloxy), a lower alkanesulfonyloxy group (e.g., methanesulfonyloxy, ethanesulfonyloxy), a benzenesulfonyloxy group or a lower alkylbenzenesulfonyloxy group (e.g., toluenesulfonyloxy) and R' has the same significance as designated above.

Examples of the starting Δ²-steroid (II) include 1α-methyl-5α-androst-2-en-17β-ol and its 17-formate, acetate, propionate, butyrate, isobutyrate, enanthate, caprylate, 1α-ethyl-5α-androst-2-en-17β-ol and its 17-acetate, propionate, butyrate, 1α-propyl-5α-androst-2-en-17β-ol and its 17-acetate, propionate, 1β-methyl-5α-androst-2-en-17β-ol and its 17-formate, acetate, propionate, butyrate, 1β-ethyl-5α-androst-2-en-17β-ol and its 17-acetate, propionate, 1β-propyl-5α-androst-2-en-17β-ol and its 17-acetate, etc.

According to the present invention, the starting Δ²-steroid (II) is first subjected to epoxy linkage-formation.

The epoxy linkage-formation may be effected by treatment with an epoxidizing agent such as a peracid (e.g., perbenzoic acid, monoperphthalic acid, peracetic acid, trifluoroperacetic acid, m-chloroperbenzoic acid), ozone or chromium trioxide, or a combination of a halogenating agent such as a hypohalogenic acid (e.g., hypochlorous acid), an N-halocarbonamide or dicarbonimide (e.g., N-bromoacetamine, N-bromosuccinimide, N-iodosuccinimide, N-chlorophthalimide), a halonium compound (e.g., iodine and silver acetate, bromine and silver benzoate, bromine and methanol) or the like and a base (e.g., alumina, pyridine, sodium bicarbonate, potassium carbonate, potassium acetate, sodium methoxide, potassium hydroxide). Treatment with the epoxidizing agent may be carried out in an inert solvent (e.g., benzene, ether, dichloromethane, chloroform) at a temperature from about −10° C. to the boiling point of the solvent used within a period from about 1 to about 150 hours. Treatment with the combination of a halogenating agent and a base may be carried out in one step wherein the introduction of a halogen atom is followed by spontaneous dehydrohalogenation to form an epoxy linkage or in two steps wherein the intermediary produced halohydrin is isolated prior to the subsequent dehydrohalogenation with a base. The halogenation may be carried out in an inert solvent (e.g., water, methanol, acetic acid chloroform, dichloromethane, carbon tetrachloride, ether, benzene) at a temperature from about 0° C. to the boiling point of the solvent used within about 10 hours, optionally in the presence of a catalyst such as an acid (e.g., perchloric acid, acetic acid). The dehydrohalogenation may be carried out in an inert solvent (e.g., water, methanol, ethanol, isopropanol, acetone) at a temperature from room temperature (10 to 20° C.) to the boiling point of the solvent used within about 24 hours. The halogenation followed by the spontaneous dehydrohalogenation may be carried out by treatment with a halogenating agent in the presence of a base, preferably an organic base (e.g., pyridine). The configuration of the epoxy linkage in the resulting product is associated with the adopted procedure. For instance, the reaction of the $\Delta^2$-steroid (II) with the combination of a halogenating agent and a base affords the $2\beta,3\beta$-epoxy-steroid (IIIa), while that with a peracid gives the $2\alpha,3\alpha$-epoxy-steroid (IIIb).

The 2,3-epoxy-steroid (IIIa or IIIb) is then subjected to epoxy linkage-fission. The epoxy linkage-fission may be effected by reacting the 2,3-epoxy-steroid (III) substantially with thiocyanic acid. Practically, the reaction is carried out by treating the 2,3-epoxy-steroid (IIIa or IIIb) with thiocyanic acid or its salt (e.g., sodium thiocyanate) in an inert solvent (e.g., water, methanol, acetone, ether, tetrahydrofuran, dioxane, chloroform, dichloromethane) at a temperature from about 0° C. to the boiling point of the solvent used within about 5 days, if required, in the presence of catalytic influence of an acid (e.g., acetic acid) or a base (e.g., pyridine).

The resultant thiocyanatohydrin (IVa or IVb) is then subjected to epithio linkage-formation as it is or after converting the hydroxyl group at the 2- or 3-position into a halogen atom or an acyloxy group (the term "acyloxy" being intended to mean lower alkanoyloxy, lower alkanesulfonyloxy, benzenesulfonyloxy and lower alkylbenzenesulfonyloxy, inclusively). For the previous conversion of the hydroxyl group into a halogen atom, the thiocyanatohydrin (IVa or IVb) may be treated in a per se conventional halogenation procedure. The conversion of the hydroxyl group into an acyloxy group may be performed by treating the thiocyanatohydrin (IVa or IVb) in a per se conventional acylation procedure. The epithio linkage-formation may be effected by reacting the free thiocyanatohydrin (IVa or IVb) or the thiocyanato halide or acylated thiocyanatohydrin (Va or Vb) with a basic agent in an inert solvent (e.g., methanol, ethanol, propanol, benzene, toluene, petroleum ether, diethylene glycol dimethyl ether). As the basic agent, they may be employed an optional base having from weak to strong basicity such as alumina, pyridine, sodium bicarbonate, potassium carbonate, sodium acetate, sodium methoxide or potassium hydroxide. It is generally preferred to carry out the reaction at a relatively mild condition, i.e., at a temperature not higher than 100° C. within about 5 days.

In the course of the above conversion, the hydroxyl group or the lower alkanoyloxy group at the 17-position may be altered each other naturally or optionally. However, the substantial conversion on the A ring as illustrated above is not affected by such alteration at the 17-position.

Examples of the resulting 2,3-epithio-steroid (I) include

1α-ethyl-2α,3α-epithio-5α-androstan-17β-ol and its 17-
  formate,
acetate,
propionate,
butyrate,
isobutyrate,
valerate,
isovalerate,
trimethylacetate,
caproate,
t-butylacetate,
enanthate,
caprylate,
1α-methyl-2β,3β-epithio-5α-androstan-17β-ol and its 17-
  acetate,
propionate,
butyrate,
enanthate,
1α-ethyl-2α,3α-epithio-5α-androstan-17β-ol and its 17-
  acetate,
propionate,
butyrate,
1α-ethyl-2β,3β-epithio-5α-androstan-17β-ol and its 17-
  acetate,
propionate,
1α-propyl-2α,3α-epithio-5α-androstan-17β-ol and its 17-
  acetate,
propionate,
1β-methyl-2α,3α-epithio-5α-androstan-17β-ol and its 17-
  formate,
acetate,
propionate,
butyrate,
1β-methyl-2β,3β-epithio-5α-androstan-17β-ol and its 17-
  acetate,
propionate,
1β-ethyl-2α,3α-epithio-5α-androstan-17β-ol and its 17-
  acetate,
propionate,
1β-ethyl-2β,3β-epithio-5α-androstan-17β-ol and its 17-acetate,
1β-propyl-2α,3α-epithio-5α-androstan-17β-ol and its 17-
  acetate,
1β-propyl-2β,3β-epithio-5α-anhydrostan-17β-ol and its 17-acetate, etc.

The 2,3-epithio-steroids (I) prepared by the present invention possess peculiar hormonic activity. Thus, they can produce potent myotropic and androgenic activities with a favorable myotropic/androgenic ratio and also potent specific antiestrogenic activity. It is notable that they show comparatively weak estrogenicity. Accordingly, they are useful as anabolic and antiestrogenic agents having less side-action and also useful for treatment of mastopathy and gyecomastia. Still, it may be noted that the 2,3-epithio-steroids (I) having a lower alkanoyloxy group at the 17-position shown the prolonged activities.

The 2,3-epithio-steroids (I) of the present invention are useful in veterinary medicine solely or in combination or in preparation in conjunction with a solid or liquid pharmaceutical excipient. The preparations are prepared by as such known methods, for example, with the use of pharmaceutical organic or inorganic excipients suitable for parenteral, enteral or local administration. Suitable excipients are substances that do not react with the products of the present invention such, for example, as water, vegetable oils, benzyl alcohols, polyethylene glycols, gelatin, lactose, starches, magnesium stearate, talc, white petroleum jelly, isopropyl myristate or other known pharmaceutical excipients. There are especially made preparation for parenteral administration, preferably solutions, above all oily or aqueous solutions, furthermore suspensions, emulsions or implants; for enteral administration there are similarly also made tablets or dragees, and for local administration also ointments or creams. If desired, auxiliaries may be added thereto, such as preserving, stabilizing, wetting or emulsifying agents, salts for regulating the osmotic pressure, or buffers. They may also contain other therapeutically useful substances. The preparations are obtained in the customary way. The content of active compound in these preparations, such as of a tablet or an ampoule, is preferably 0.1 to 200 mg. or 0.03 to 60%. The average dose for adult mammal is preferably 5 to 100 mg./week.

The following examples represent presently-preferred embodiments of the present invention, but it is to be understood that the examples are given by way of illustration only and not of limitation.

EXAMPLE 1

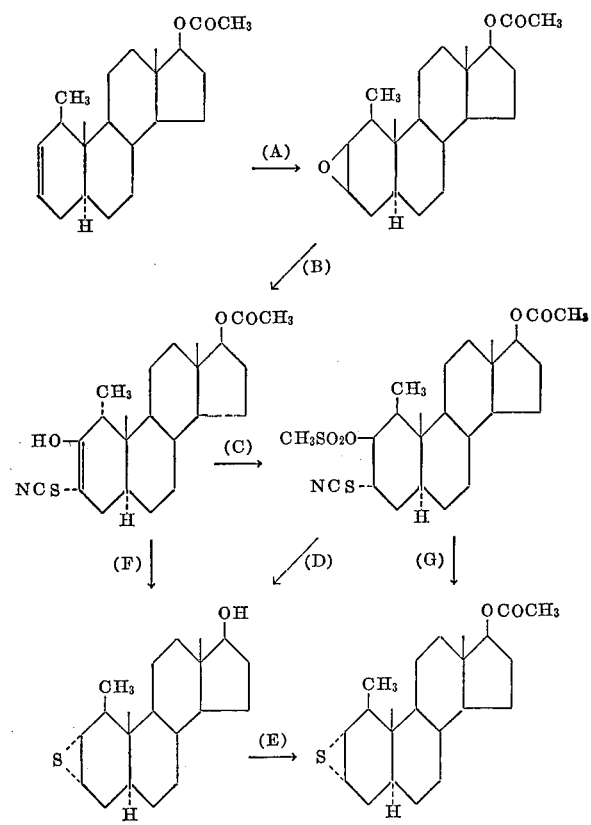

(A) Preparation of 1α-methyl-2β,3β-epoxy-5α-androstan-17β-ol 17-acetate.—To a solution of 1α-methyl-5α-androst-2-en-17β-ol 17-acetate [Neth. Pat. 6,403,658] (7.152 g.) in a mixture of dioxane (80 ml.) and water (20 ml.), there are added N-bromo-succinimide (5.02 g.) and perchloric acid (41.8 ml.) while cooling with ice, and the resultant mixture is stirred for 5 hours. Water is added to the reaction mixture while cooling with ice. The separated oil is extracted with ether. The ether extract is washed with sodium bicarbonate solution and water in order, dried and concentrated at room temperature (10 to 20° C.). The residue (9 g.) is dissolved in ethanol (135 ml.) and potassium acetate (9.2 g.) added thereto. The resultant mixture is refluxed on a water bath for 1.5 hours. After cooling, a mixture of ice and water is added thereto. The separated oil is extracted with ether. The extract is washed with sodium bicarbonate solution, dried over anhydrous sodium sulfate and concentrated under reduced pressure. The residue (7.6 g.) is chromatographed on 5% alumina. The eluate with petroleum ether is crystallized from hexane to give crystals (3.602 g.) melting at 159 to 164° C.

IR: $\nu_{max.}^{Nujol}$ cm.$^{-1}$: 1732, 1253, 1045, 813, 801

(B) Preparation of 1α-methyl-3α-thiocyanato-5α-androstane-2β,17β-diol 17-acetate.—To a solution of 1α-methyl-2β,3β-epoxy-5α-androstan-17β-ol 17-acetate (2.544 g.) in dichloromethane (11 ml.), there is added an ethereal solution of thiocyanic acid prepared from potassium thiocyanate (12 g.), phosphoric acid (16 g.) and ether (20 ml.), and the resultant mixture is allowed to stand at room temperature (10 to 20° C.) for 2.5 hours. After cooling, the reaction mixture is neutralized with sodium bicarbonate, washed with water, dried over anhydrous sodium sulfate and concentrated. The residue is treated with a mixture of ether and petroleum ether and crystallized from a mixture of acetone and hexane to give crystals (2.746 g.) melting at 155 to 158° C.

IR: $\nu_{max.}^{Nujol}$ cm.$^{-1}$: 3532, 2144, 1714, 1270, 1040

(C) Preparation of 1α-methyl-2-methanesulfonyloxy-3α-thiocyanato-5α-androstan-17β-ol 17-acetate.—A mixture of 1α-methyl-3α-thiocyanato-5α-androstane-2a,17β-diol 17-acetate (2.596 g.), methanesulfonyl chloride (2.6 ml.) and pyridine (27 ml.) is allowed to stand at 0° C. overnight. After addition of a mixture of ice and water, the resulting mixture is extracted with dichloromethane. The extract is washed with hydrochloric acid, sodium carbonate solution and water in order, dried over anhydrous sodium sulfate and concentrated. The residue (3.035 g.) is crystallized from ether and recrystallized from a mixture of acetone and hexane to give crystals (2.736 g.) melting at 162 to 164° C.

IR: $\nu_{max.}^{Nujol}$ cm.$^{-1}$: 2158, 1734, 1247, 1179, 918, 850, 829

(D) Preparation of 1α-methyl-2α,3α-epithio-5α-androstan-17β-ol.—To a solution of 1α-methyl-2β-methanesulfonyloxy-3α-thiocyanato-5α-androstan-17β-ol 17 - acetate (2.6 g.) in dioxane (80 ml.), there is added a solution of potassium hydroxide (2.6 g.) in methanol (50 ml.), and the resulting mixture is stirred at room temperature (10 to 20° C.) for 15.5 hours. The reaction mixture is diluted with water and filtered. The collected substance is washed with water and crystallized from a mixture of acetone and hexane to give crystals (1.414 g.) melting at 124 to 125.5° C.

IR: $\nu_{max.}^{Nujol}$ cm.$^{-1}$: 3446, 1051, 959

(E) Preparation of 1α-methyl-2α,3α-epithio-5α-androstan-17β-ol 17-acetate.—A mixture of 1α-methyl-2α,3α-epithio-5α-androstan-17β-ol (109 mg.), pyridine (0.3 ml.) and acetic anhydride (0.18 ml.) is allowed to stand at room temperature (10 to 20° C.) overnight. After addition of a mixture of ice and water, the reaction mixture is extracted with either. The extract is washed with hydrochloric acid, sodium carbonate solution and water in order, dried over anhydrous sodium sulfate and concentrated. The residue (117 mg.) is chromatographed on alumina (2.1 g.). The eluates with petroleum ether to petroleum ether-benzene (94:6) are combined together, concentrated and crystallized from methanol to give crystals (96 mg.) melting at 106.5 to 109° C.

IR: $\nu_{max.}^{Nujol}$ cm.$^{-1}$ 1734, 1045, 1029, 1021, 955

In the similar manner, treatments of 1α-methyl-2α,3α-epithio-5α-androstan-17β-ol with propionic anhydride in aqueous potassium carbonate solution or pyridine, butyric anhydride in pyridine, valeric anhydride in trimethylamine, trimethylacetyl chloride in pyridine and enanthoyl chloride in pyridine afford respectively the corresponding 17-propionate, butyrate, valerate, trimethylacetate and enanthate.

(F) Preparation of 1α-methyl-2α,3α-epithio-5α-androstan-17β-ol.—To a solution of 1α-methyl-3α-thiocyanato-5α-androstane-2β,17β-diol 17-acetate (1.2 g.) in dioxane (40 ml.), there is added a solution of potassium carbonate (1.5 g.) in methanol (30 ml.), and the resulting mixture is stirred at room temperature (10 to 20° C.) overnight. The reaction mixture is diluted with water and filtered. The collected substance is washed with water and crystallized from a mixture of acetone and hexane to give crystals (0.7 g.) melting at 124 to 125.5° C.

(G) Preparation of 1α-methyl-2α,3α-epithio-5α-androstan-17β-ol 17-acetate.—A solution of 1α-methyl-2β-methanesulfonyloxy-3α-thiocyanato-5α-androstan-17β - ol 17-acetate (0.5 g.) in benzene (20 ml.) is poured onto alumina (20 g.) packed in a glass tube. After 2 days, the alumina column is eluted with benzenechloroform (1:1). The eluate is concentrated, and the residue is crystallized from methanol to give crystals (0.25 g.) melting at 106.5 to 109° C.

EXAMPLE 2

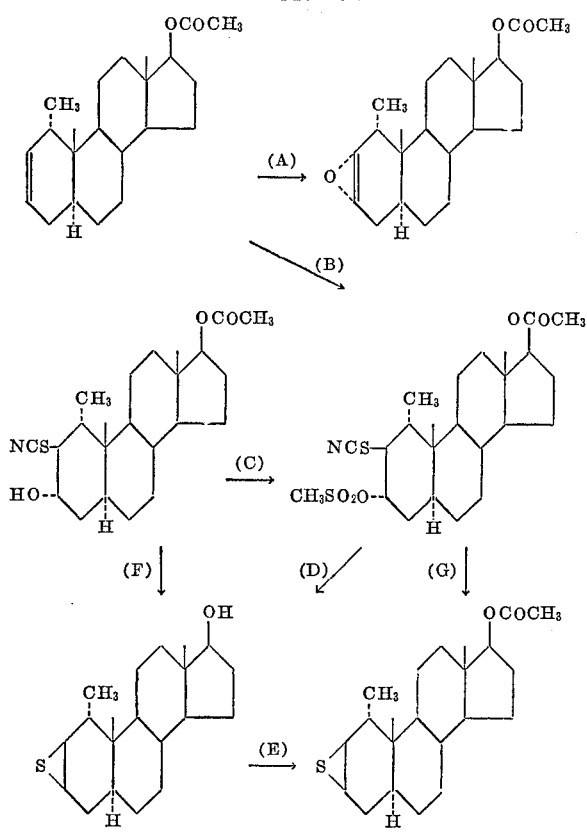

(A) Preparation of 1α-methyl-2α,3α-epoxy-5α-androstan-17β-ol 17-acetate.—To a solution of 1α-methyl-5α-androst-2-en-17β-ol 17-acetate (1.03 g.) in chloroform (8 ml.), there is added m-chloroperbenzoic acid (803 mg.), and the resulting mixture is allowed to stand at 0° C. overnight. After separation of the solid material by filtration, the filtrate is extracted with a mixture of ether and chloroform (2:1). The extract is washed with sodium bicarbonate solution and water in order, dried over sodium sulfate and concentrated. The resulting oily product (1.314 g.) is treated with aqueous methanol to give crystals (700 mg.) melting at 104 to 107.5° C.

IR: $\nu_{max.}^{Nujol}$ cm.$^{-1}$: 1732, 1254, 1028, 825, 817

(B) Preparation of 1α-methyl-2β-thiocyanato-5α-androstane-3α,17β-diol 17-acetate.—To a solution of 1α-methyl-2α,3α-epoxy-5α-androstan-17β-ol 17-acetate (645 mg.) in dichloromethane (7 ml.), there is added an ethereal solution of thiocyanic acid prepared from potassium thiocyanate (3.7 g.), phosphoric acid (45.0 g.) and ether (8 ml.), and the resulting mixture is allowed to stand at room temperature (10 to 20° C.) overnight. The reaction mixture is diluted with water and extracted with ether. The extract is washed with sodium carbonate solution and water in order, dried over anhydrous sodium sulfate and concentrated under reduced pressure. The residue (777 mg.) is treated with a mixture of ether and petroleum ether and crystallized from acetone to give crystals (430 mg.) melting at 204 to 208° C.

IR: $\nu_{max.}^{Nujol}$ cm.$^{-1}$: 3400, 2154, 1704, 1276, 1046, 781

(C) Preparation of 1α-methyl-2b-thiocyanato-3α-methanesulfonyloxy-5α-androstan-17β-ol 17-acetate.—A mixture of 1α-methyl-2β-thiocyanato-5α-androstane - 3α,17β-diol 17-acetate (369 mg.), methanesulfonyl chloride (0.7 ml.) and pyridine (4 ml.) is allowed to stand at 0° C. for 40 hours. After addition of a mixture of ice and water, the resulting mixture is extracted with a mixture of ether and dichloromethane (2:1). The extract is washed with hydrochloric acid, sodium carbonate solution and water in order, dried over anhydrous sodium sulfate and concentrated to give an oily product (408 mg.).

(D) Preparation of 1α-methyl-2β,3β-epithio-5α-androstan-17β-ol.—To a solution of 1α-methyl-2β-thiocyanato-3α-methanesulfonyloxy-5α-androstan-17β-ol 17 - acetate (398 mg.) obtained as an oily product in (C) in dioxane (16 ml.), there is added a solution of potassium hydroxide (450 mg.) in methanol (8 ml.), and the resultant mixture is stirred at room temperature (10 to 20° C.) for 16.5 hours. After addition of water, the reaction mixture is extracted with ether. The ether extract is washed with water, dried over anhydrous sodium sulfate and concentrated. The residue is crystallized from aqueous methanol to give crystals (147 mg.) melting at 131 to 134° C.

IR: $\nu_{max.}^{Nujol}$ cm.$^{-1}$: 3320, 1060, 957

(E) Preparation of 1α-methyl-2β,3β-epithio-5α-androstan-17β-ol 17-acetate.—A mixture of 1α-methyl-2β,3β-epithio-5α-androstan-17β-ol (75 mg.), pyridine (0.2 ml.) and acetic anhydride (0.1 ml.) is allowed to stand at room temperature (10 to 20° C.) overnight. After addition of water, the reaction mixture is extracted with a mixture of ether and dichloromethane (2:1). The extract is washed with hydrochloric acid, sodium carbonate solution and water in order, dried over anhydrous sodium sulfate and concentrated. The residue (82 mg.) is crystallized from acetone to give crystals (63 mg.) melting at 155 to 157.5° C.

(F) Preparation of 1α-methyl-2β,3β-epithio-5α-androstan-17β-ol.—To a solution of 1α-methyl-2β-thiocyanato-5α-androstane-3α,17β-diol 17-acetate. (1.35 g.) in dioxane (40 ml.), there is added a solution of potassium hydroxide (1.2 g.) in methanol (30 ml.), and the resulting mixture is stirred at room temperature (10 to 20° C.) overnight. The reaction mixture is diluted with water and then extracted with ether. The ether extract is washed with water, dried over anhydrous sodium sulfate and concentrated. The residue is crystallized from aqueous methanol to give crystals (0.55 g.) melting at 131 to 134° C.

(G) Preparation of 1α-methyl-2β,3β-epithio-5α-androstan-17β-ol 17-acetate.—A solution of 1α-methyl-2β-thiocyanato-3α-methanesulfonyloxy-5α-androstan-17β - ol 17-acetate (452 mg.) and potassium hydroxide (0.5 g.) in diethylene glycol dimethyl ether (10 ml.) is stirred at room temperature (10 to 20° C.) overnight. The reaction mixture is diluted with water and then extracted with chloroform. The chloroform extract is washed with water, dried over anhydrous sodium sulfate and concentrated. The resultant residue (356 mg.) is chomatographed on alumina. The eluates with petroleum ether to petroleum ether-benzene (80:20) are combined together, concentrated and crystallized from acetone to give crystals (189 mg.) melting at 131 to 134° C.

EXAMPLE 3

Preparation of 1α-ethyl-2α,3α-epithio-5α-androstan-17β-ol and its 17-acetate.—In the similar procedure to Example 1(A–G), 1α-ethyl-5α-androst-2-en-17β-ol 17-acetate is successively converted into 1α-ethyl-2β,3β-epoxy-5α-androstan-17β-ol 17-acetate, 1α-ethyl-3α-thiocyanato - 5α-androstane-2β,17β-diol 17-acetate, 1α-ethyl-2β-methanesulfonyloxy-3α-thiocyanato-5α-androstan-17β-ol 17 - acetate, 1-ethyl-2α,3α-epithio-5α-androstan-17β-ol and its 17-acetate.

EXAMPLE 4

Preparation of 1β-methyl-2α,3α-epithio-5α-androstan-17β-ol and its 17-acetate.—In the similar manner to Example 1(A–G), 1β-methyl-5α-androst-2-en-17β-ol 17-acetate is successively converted into 1β-methyl-2β,3β-epoxy-5α-androstan-17β-ol 17-acetate, 1β-methyl-3α-thiocyanato-5α-androstane-2β,17β-diol 17-acetate, 1β-methyl-2β-methanesulfonyloxy-3α-thiocyanato-5α-androstan-17β - ol 17-acetate, 1β-methyl-2α,3α-epithio-5α-androstan-17β-ol and its 17-acetate.

What is claimed is:
1. A 2,3-epithio-steroid of the formula:

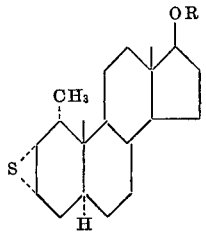

wherein R is a hydrogen atom or a lower alkanoyl group.

2. A 2,3-epithio-steroid claimed in claim 1 wherein R is H, namely 1α-methyl-2α,3α-epithio-5α-androstan-17β-ol.

3. A composition for veterinary use comprising a pharmaceutically acceptable carrier containing therein a 2,3-epithio-steroid of the formula:

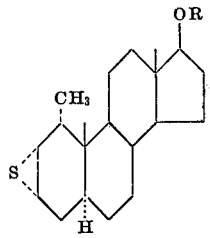

wherein R is a hydrogen atom or a lower alkanoyl group, in 0.1 to 200 mg. content or 0.03 to 60% concentration.

4. A composition for veterinary use claimed in claim 3, wherein the 2,3-epithio-steroid is 1α-methyl-2α,3α-epithio-5α-androstan-17β-ol.

References Cited

UNITED STATES PATENTS

| | | | |
|---|---|---|---|
| 3,009,934 | 11/1961 | Counsell et al. | 260—397.4 |
| 3,105,831 | 10/1963 | Komeno | 260—239.5 |
| 3,169,136 | 2/1965 | Bowers et al. | 260—397.5 |
| 3,230,215 | 1/1966 | Komeno | 260—239.5 |
| 3,301,850 | 1/1967 | Klimstra | 260—239.5 |
| 3,301,876 | 1/1967 | Klimstra | 260—239.5 |
| 3,304,302 | 2/1967 | Clarke | 260—239.5 |

LEWIS GOTTS, *Primary Examiner.*

JOHNNIE R. BROWN, *Assistant Examiner.*

U.S. Cl. X.R.

260—239.5, 239.55, 397.5